US009274964B2

(12) United States Patent
Liang et al.

(10) Patent No.: US 9,274,964 B2
(45) Date of Patent: Mar. 1, 2016

(54) MULTI-BANK CACHE MEMORY

(75) Inventors: Jian Liang, San Diego, CA (US); Chun Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 13/364,901

(22) Filed: Feb. 2, 2012

(65) Prior Publication Data

US 2013/0205091 A1 Aug. 8, 2013

(51) Int. Cl.
*G06F 12/08* (2006.01)

(52) U.S. Cl.
CPC ........ *G06F 12/0846* (2013.01); *G06F 12/0855* (2013.01); *G06F 12/084* (2013.01); *G06F 12/0851* (2013.01); *G06F 2212/1016* (2013.01)

(58) Field of Classification Search
CPC ............ G06F 12/0846; G06F 12/0855; G06F 12/084; G06F 12/0851; G06F 2212/1016
USPC .............................................. 711/5, 118, 130
See application file for complete search history.

(56) References Cited

U.S. PATENT DOCUMENTS

| | | | |
|---|---|---|---|
| 3,967,247 A | 6/1976 | Andersen et al. | |
| 5,740,401 A | 4/1998 | Hanawa et al. | |
| 7,219,185 B2 | 5/2007 | Luick | |
| 7,571,284 B1 * | 8/2009 | Olson et al. | 711/122 |
| 7,600,080 B1 | 10/2009 | Bhattacharyya et al. | |
| 2002/0065988 A1 | 5/2002 | Lasserre et al. | |
| 2004/0133744 A1 * | 7/2004 | Van Doren et al. | 711/118 |
| 2008/0104369 A1 | 5/2008 | Reed | |
| 2008/0140980 A1 * | 6/2008 | Mei et al. | 711/170 |
| 2008/0282034 A1 * | 11/2008 | Jiao et al. | 711/125 |
| 2010/0268882 A1 * | 10/2010 | Cargnoni et al. | 711/122 |
| 2011/0197028 A1 * | 8/2011 | Nikara et al. | 711/118 |

OTHER PUBLICATIONS

International Search Report and Written Opinion—PCT/US2013/022759—ISA/EPO—Jun. 21, 2013, 12 pp.
Second Written Opinion dated Jan. 31, 2014, from International Application No. PCT/US2013/022759, 24 pp.

* cited by examiner

*Primary Examiner* — Michael Alsip
(74) *Attorney, Agent, or Firm* — Shumaker & Sieffert, P.A.

(57) ABSTRACT

In general, this disclosure describes techniques for increasing the throughput of multi-bank cache memory systems accessible by multiple clients. Requests for data from a client may be stored in a pending buffer associated with the client for a first cache memory bank. For each of the requests for data, a determination may be made as to if the request is able to be fulfilled by a cache memory within the first cache memory bank regardless of a status of requests by the client for data at a second cache memory bank. Data requested from the cache memory by the client may be stored in a read data buffer associated with the client according to an order of receipt of the requests for data in the pending buffer.

24 Claims, 5 Drawing Sheets

MULTI-BANK CACHE MEMORY

TECHNICAL FIELD

This disclosure generally relates to a computer system and more specifically relates to a cache memory system.

BACKGROUND

Cache memory systems in computer systems typically provide relatively smaller and lower latency memory. Such cache memory stores copies of a subset of data stored in main memory to reduce the average time to access data. Conflicts may arise when multiple clients attempt to access the cache memory system at the same time.

One technique for reducing conflicts between multiple clients may include dividing the cache memory system into multiple cache memory banks each containing a portion of the data in the cache memory system, so that multiple clients may each be able to access a different cache memory bank in cache memory system at the same time, thereby reducing conflicts between clients and increasing the throughput of the cache memory system. However, a high percentage of conflicts may still occur, thereby reducing the throughput of cache memory systems.

SUMMARY

In general, this disclosure describes techniques for increasing the throughput of multi-bank cache memory systems accessible by multiple clients. By employing a set of buffers for each client in each memory bank, the techniques of this disclosure may allow multiple clients to dispatch requests to the same memory bank of a cache memory system at the same time, thereby reducing conflicts between clients. The techniques of this disclosure may further allow requests for data dispatched by clients to be serviced out of order between the memory banks of a cache system, thereby reducing bank conflicts between memory banks and increase the throughput of multi-bank cache memory systems.

In one example, a method may include storing requests for data from a client in a pending buffer associated with the client for a first cache memory bank. The method may further include determining if each of the requests for data is able to be fulfilled by a cache memory within the first cache memory bank regardless of a status of requests by the client for data at a second cache memory bank. The method may further include storing, by a read data buffer associated with the client for the first cache memory bank, data requested from the cache memory by the client according to an order of receipt of the requests for data in the pending buffer.

In another example, a system may include a cache memory system accessible by a plurality of clients, the cache memory system including a plurality of cache memory banks, wherein each of the plurality of cache memory banks includes: cache memory, and a tag checking unit configured to determine if a request for data from a client in the plurality of clients is able to be fulfilled by the cache memory regardless of a status of requests by the client at another cache memory bank within the plurality of cache memory banks. The system may further include a plurality of pending buffers associated with the plurality of clients for the plurality of cache memory banks, wherein the pending buffers are configured to store requests for data in order of receipt from an associated client in the plurality of clients pending a determination if the requests for data are able to be fulfilled by the cache memory. The system may further include a plurality of read data buffers associated with the plurality of clients for the plurality of cache memory banks, wherein the read data buffers are configured to store data requested from the cache memory by the associated client according to the order of receipt by a pending buffer associated with the associated client within the pending buffers.

In another example, an apparatus may include means for storing requests for data from a client for a first cache memory bank. The apparatus may further include means for determining if each of the requests for data is able to be fulfilled by a cache memory regardless of a status of requests by the client for data at a second cache memory bank. The apparatus may further include means for storing data requested from the cache memory by the client for the first memory bank.

In another example, an apparatus may include one or more processors. The one or more processors may be configured to store requests for data from a client for a first cache memory bank. The one or more processors may further be configured to determine if each of the requests for data is able to be fulfilled by a cache memory regardless of a status of requests by the client for data at a second cache memory bank. The one or more processors may further be configured to store data requested from the cache memory by the client for the first memory bank.

The details of one or more examples are set forth in the accompanying drawings and the description below. Other features, objects, and advantages will be apparent from the description and drawings, and from the claims.

DETAILED DESCRIPTION

Figure 1:
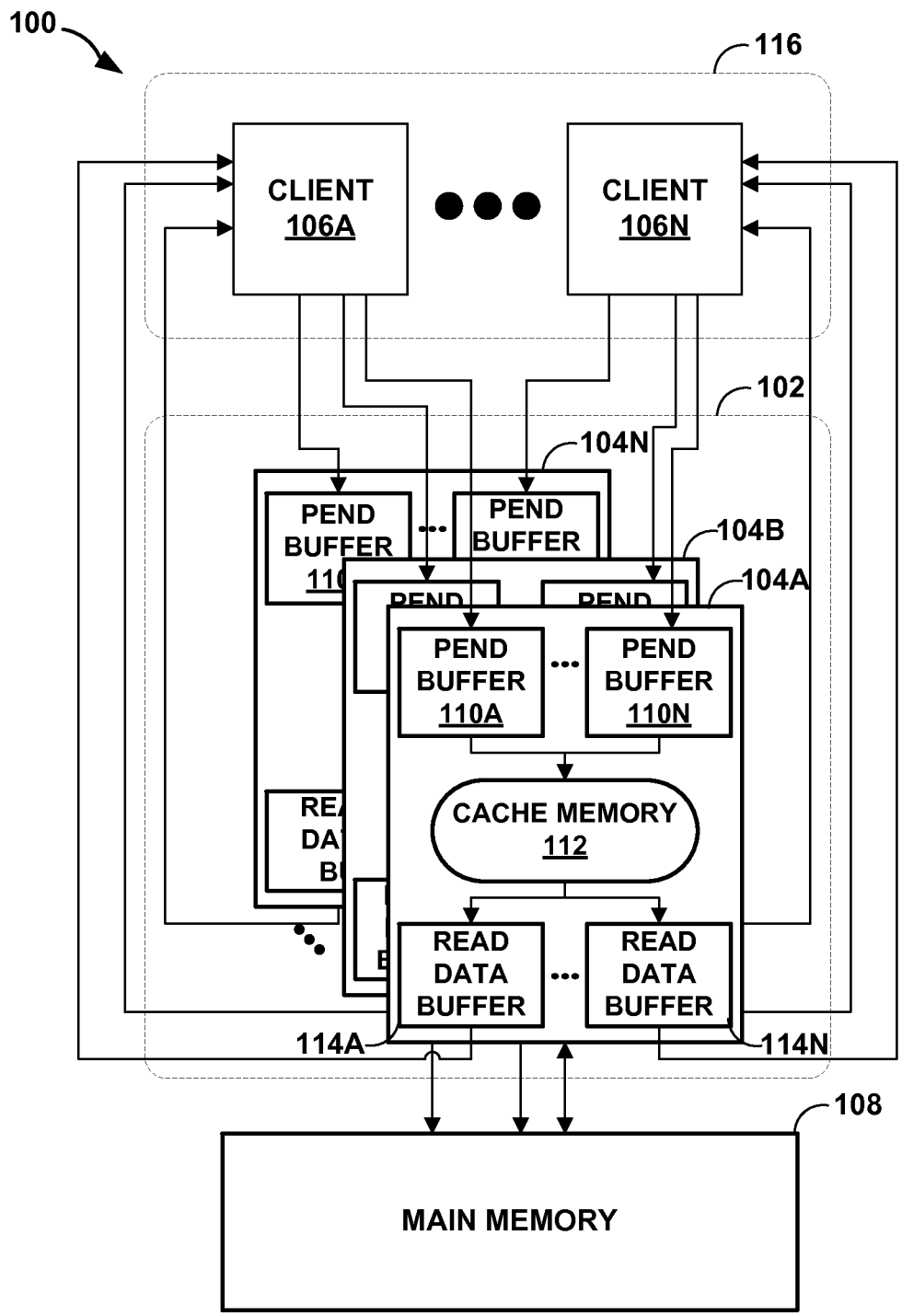
FIG. 1 is a block diagram illustrating an example computer system that includes an example processor, an example cache memory system, and an example main memory according to some aspects of the present disclosure.

In general, this disclosure describes techniques for increasing the throughput of multi-bank cache memory systems accessible by multiple clients. Although a multi-bank cache memory system may reduce conflicts between clients of the cache memory system by enabling clients to access different cache memory banks of the cache memory system at the same time, conflicts between clients may still occur if multiple clients are attempting to access the same cache memory bank of a cache memory system at the same time.

By associating a set of buffers with each of the clients for each memory bank, the techniques of this disclosure may allow a single memory bank of a multi-bank memory bank system to accept requests from multiple clients at the same time, thereby reducing conflicts between clients. Furthermore, the techniques of this disclosure may enable requests for data dispatched by clients to be serviced out of order between the memory banks of a cache system, and may thereby reduce bank conflicts between memory banks and increase the throughput of multi-bank cache memory systems. In simulation, a multi-bank cache memory system including four cache memory banks and servicing four clients may improve cache memory throughput from 43% to 97% with random access by using techniques of this disclosure.

Clients accessing a multi-bank cache memory system may each be associated with a pending buffer for each cache memory bank of the cache memory system. Requests dispatched by a client to a specific cache memory bank in the cache memory system may be stored at a pending buffer associated with the client for the specified cache memory bank. Requests dispatched from multiple clients to the same cache memory bank may be stored at separate pending buffers associated with each client for that cache memory bank.

Requests dispatched from a client to a single cache memory bank may be processed in order of receipt from the client. Processing a request may include tag checking the request or otherwise determining if the cache memory in the cache memory bank is able to fulfill the request. However, requests dispatched by the client to the cache system may, as a whole, be processed out of order related to the order of receipt. For example, the client may dispatch in order a first request and a second request to a first cache memory bank, and may subsequently dispatch a third request to a second cache memory bank. Although the requests may be processed in order within a single cache memory bank, so that the first request may be processed before the second request in the first cache memory bank, the requests as a whole may be processed out of order so that the third request may be processed in the second cache memory bank before the first request or the second request is processed in the first cache memory bank.

Clients accessing a multi-bank cache memory system may each also be associated with a read data buffer for each cache memory bank of the cache memory system. Data requested by the client may be retrieved and stored at a read data buffer associated with the client for the specified cache memory bank. Data requested by multiple clients in the same cache memory bank may be stored at separate read data buffers associated with each client for that cache memory bank.

Clients may read their associated read data buffers for the cache memory banks in order to retrieve the requested data. Clients may keep track of the order in which requests were dispatched to each of the cache memory banks, and may read from the read data buffers for each of the cache memory banks based on that order so that the clients may receive the requested data in the same order as the corresponding requests for data were dispatched.

FIG. 1 is a block diagram illustrating an example computer system that includes an example processor, an example cache memory system, and an example main memory according to some aspects of the present disclosure. As shown in FIG. 1, computer system 100 may include processor 116, cache memory system 102, and main memory 108 that may all be operably coupled to each other.

Processor 116 may be configured to implement functionality and/or process instructions for execution within computer system 100. Processor 116, in some examples, may be a microprocessor, such as a central processing unit, a graphics processing unit in a graphics processing system, and the like. Processor 116 may include clients 106A-106N ("clients 106"). Clients 106 may include any modules or components of processor 116 that are configured to request data from cache memory system 102, write data to cache memory system 102, and receive data from cache memory system 102. For example, clients 106 may include pipelines of processor 116, such as rendering pipelines of a graphics processing unit, or instruction pipelines of a central processing unit. Clients 106 may, in some examples, also be software, such as an application, that is operable to execute on processor 116. In some examples, one or more processors in computer system 100, such as processor 116, may be configured to direct and control the operations of clients 106 and cache memory system 102, including the sub-components of clients 106 and cache memory system 102.

Cache memory system 102 may store information within computer system 100 during operation and may be configured to cache data for main memory 108, and may be closer to clients 106 in the memory hierarchy than main memory 108, so that cache memory system 102 may provide to clients 106 faster access to data as compared to main memory 108. Cache memory system 102 may generally have faster access times and lower latency compared to main memory 108, so that it may be faster for clients 106 to retrieve data from cache memory system 102 compared to main memory 108.

Cache memory system 102 may include cache memory banks 104A-104N ("cache memory banks 104"). Cache memory banks 104 may include static random access memory (SRAM), dynamic random access memory (DRAM), a combination of SRAM and DRAM, or any other suitable random access memory. Each of the cache memory banks 104 may act as a cache for a portion of addresses in main memory 108, so that each address in main memory 108 may be associated with one of the cache memory banks 104. By splitting cache memory system 102 into multiple cache memory banks 104, multiple clients in the clients 106 may be able to access cache memory system 102 in parallel.

Each of the cache memory banks 104 may include pending buffers 110A-110N ("pending buffers 110"). Each client in clients 106 may be associated with a pending buffer in pending buffers 110 in each of the cache memory banks 104, so that each of pending buffers 110 in one of cache memory banks 104 may be associated with each client in clients 106.

Each cache memory bank of cache memory banks 104 may also include cache memory 112 and read data buffers 114A-114N ("read data buffers 114"). Each client in clients 106 may be associated with a read data buffer in read data buffers 114 for each of the cache memory banks 104, so that each of read data buffers 114 in one of cache memory banks 104 may also be associated with each client in clients 106.

A client in clients 106 may send requests for data to one of the cache memory banks 104. In one example, the requests for data may each include a memory address indicating the location of the data in main memory 108. The requests for data may be queued at a pending buffer associated with the client in pending buffers 110 until the requests for data may be fulfilled. The clients 106 may arbitrate with each other to access cache memory 112 to determine if cache memory 112 is able to fulfill the requests for data. In some examples, cache memory 112 may be able to fulfill a request for data if cache memory 112 contains the requested data. If cache memory 112 is unable to fulfill a request for data, the data may be retrieved from main memory 108 and stored into cache memory 112. After the requests for data are fulfilled, either by cache memory 112 or by main memory 108, the requested data may be queued in a read data buffer associated with the client in read data buffers 114 in the same order as the requests for data were received by the cache memory bank until the requested data is ready to be returned to the client. The data requested may be returned to the client by the cache memory banks 104 in the same order that the requests for data were dispatched by the client to the cache memory banks 104.

Figure 2:
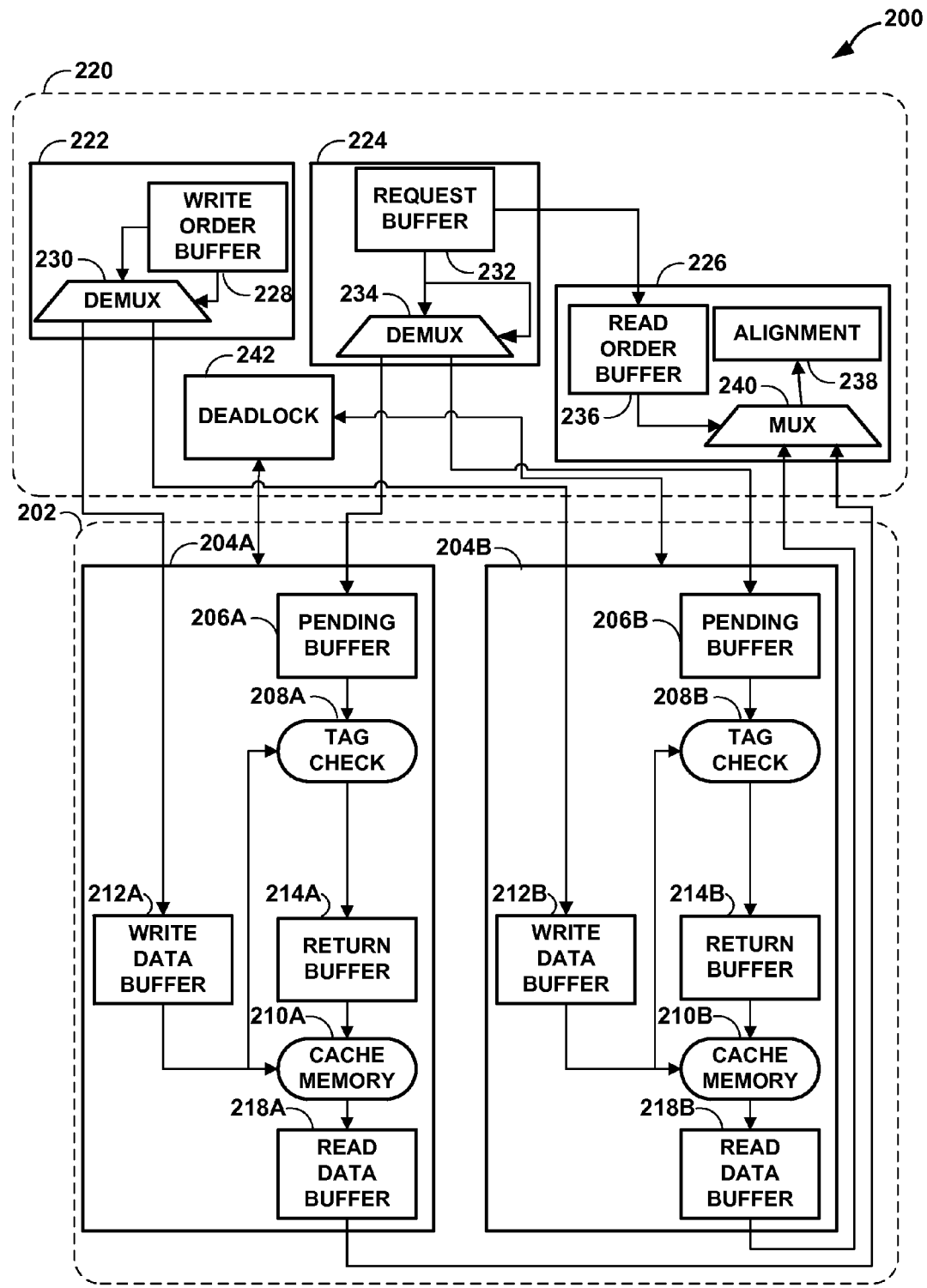
FIG. 2 is a block diagram illustrating an example computer system that includes an example client and an example cache memory system according to some aspects of the present disclosure.

FIG. 2 is a block diagram illustrating an example computer system, such as the computer system 100 shown in FIG. 1, that includes an example client, such as one of the clients 106 shown in FIG. 1, and an example cache memory system, such as cache memory system 102 shown in FIG. 1, according to some aspects of the present disclosure. As shown in FIG. 2, computer system 200 may include client 220, and cache memory system 202. Computer system 200 may comprise a graphics processing system, and client 220 may be a rendering pipeline of the graphics processing system.

Cache memory system 202 may include cache memory banks 204A and 204B. Although the cache memory system 202 is illustrated as including two cache memory banks 204A and 204B, techniques of the present disclosure may be used to implement a cache memory system that includes any number of cache memory banks.

Client 220 may be associated with a write data buffer for each cache memory bank in cache memory system 202. In the illustrated example, client 220 may be associated with write data buffers 212A and 212B, which may be included in respective cache memory banks 204A and 204B. In some examples, write data buffers 212A and 212B may not be included in respective cache memory banks 204A and 204B, but may instead be included in client 220 or elsewhere in computer system 200. Although the example illustrated by FIG. 2 includes a single write data buffer 212A for cache memory bank 204A and a single write data buffer 212B for cache memory bank 204B, the respective cache memory banks 204A and 204B may each contain or otherwise be associated with a write data buffer for each client that accesses cache memory system 202.

Write data buffers 212A and 212B may each be configured to store and queue write requests dispatched from client 220 to respective cache memory banks 204A and 204B in the order they were dispatched to respective cache memory banks 204A and 204B. The write requests may include data and an indication of a memory location, and may be stored by write data buffers 212A and 212B until the data contained in the write requests is written into respective cache memories 210A and 210B at a cache memory location corresponding to the indicated memory location included in the write requests.

Client 220 may be associated with a pending buffer for each cache memory bank in cache memory system 202. In the illustrated example, client 220 may be associated with pending buffers 206A and 206B, which may be included in respective cache memory banks 204A and 204B. In some examples, pending buffers 206A and 206B may not be included in respective cache memory banks 204A and 204B, but may instead be included in client 220 or elsewhere in computer system 200. Although the example illustrated by FIG. 2 includes a single pending buffer 206A for cache memory bank 204A and a single pending buffer 206B for cache memory bank 204B, the respective cache memory banks 204A and 204B may each contain or otherwise be associated with a pending buffer for each client that accesses cache memory system 202.

Pending buffers 206A and 206B may each be configured to store and queue requests for data dispatched from client 220 to respective cache memory banks 204A and 204B in order of receipt at respective cache memory banks 204A and 204B. The requests for data may be stored by pending buffers 206A and 206B pending a determination of if each of the requests for data stored by pending buffers 206A and 206B is able to be fulfilled by cache memory 210A and cache memory 210B, respectively. In some examples, cache memory 210A and cache memory 210B may be able to fulfill requests for data if the data requested is stored within respective cache memory 210A and cache memory 210B.

Client 220 may also be associated with deadlock protection unit 242. Deadlock protection unit 242 may be implemented via hardware, software, or a combination of hardware and software, and may be configured to determine if each of the pending buffers 206A and 206B associated with client 220 are able to accept additional requests for data from client 220 based at least in part on if accepting additional requests may cause a deadlock situation between cache memory banks 204A and 204B. Details of deadlock protection units, such as deadlock protection unit 242, will be discussed in greater detail below, with respect to FIG. 3 and FIG. 4.

Cache memory banks 204A and 204B may include respective tag checking units 208A and 208B. Tag checking units 208A and 208B may be implemented via hardware, software, or a combination of hardware and software, and may be configured to determine if each of the requests for data in the respective pending buffers 206A and 206B is able to be fulfilled by the respective cache memories 210A and 210B. Typically, each cache block in a cache may be labeled by a tag, and the tag may generally include a portion of the address in main memory that corresponds to the cache block. The tag checking units 208A and 208B may compare at least a portion of the memory address included in a request for data against tags of cache blocks in respective cache memories 210A and 210B to determine of at least a portion of the memory address matches a tag of a cache block in the respective cache memories 210A and 210B. If at least a portion of the memory address matches a tag of a cache block, then the requested data may be located at the cache block of cache memory. If a request for data is not able to be fulfilled by the cache memory in the associated cache memory bank, the cache memory may query the main memory (not shown) for the requested data and may update itself with the requested data. The cache memories 210A and 210B may be an instruction cache, a data cache, or any other memory or storage managed to take advantage of locality of access to provide to client 220 faster access to data as compared to the main memory (not shown).

The requests for data stored in respective pending buffers 206A and 206B may be tag checked by respective tag checking units 208A and 208B in a first-in-first-out fashion so that requests in a single cache memory bank are tag checked in order. Although requests in a single cache memory bank may be tag checked in order, the order that requests are tag checked in the cache memory banks may be out of order with respect to the order that the requests were dispatched by request client 220 to cache memory system 202. For example, client 220 may dispatch a first request for data to cache memory bank 204A, and may subsequently dispatch a second request for data to cache memory bank 204B. However, tag checking unit 208B in cache memory bank 204B may be able to tag check the second request for data before tag checking unit 208A is able to tag check the first request for data. Thus, cache memory banks 204A and 204B may tag check requests dispatched from client 200 in order of receipt by within a single cache memory bank, but may tag check requests out of order as compared with other cache memory banks in cache memory system 202 regardless of the status of requests from client 200 at other cache memory banks.

Client 220 may also be associated with a return buffer for each cache memory bank in cache memory system 202. In some examples, return buffers may be useful to buffer requests for data that were not able to be fulfilled by cache memory, so that those requests for data may be able to wait as the requested data are fetched from main memory. Although the example illustrated by FIG. 2 includes a single return buffer 214A for cache memory bank 204A and a single return buffer 214B for cache memory bank 204B, the respective cache memory banks 204A and 204B may each contain or otherwise be associated with a return buffer for each client that accesses cache memory system 202.

In the illustrated example, the client may be associated with return buffers 214A and 214B, which may be included in respective cache memory banks 204A and 204B. Return buffers 214A and 214B may each be configured to store requests for data from client 220 after respective tag check units 280A and 208B have determined if the requests for data are able to be fulfilled by respective cache memories 210A and 210B. Return buffers 214A and 214B may store and queue the requests for data in the same order as they were received by respective cache memory banks 204A and 204B. The requests for data may remain in return buffers 214A and 214B until the requested data is able to be accessed from the cache memories 210A and 210B.

The requests for data stored in respective return buffers 214A and 214B may be serviced by respective cache memories 210A and 210B in a first-in-first-out fashion so that requests in a single cache memory bank are serviced in order. Although requests in a single cache memory bank may be serviced in order, the order that requests are serviced in the cache memory banks may be out of order with respect to the order that the requests were dispatched by request client 220 to cache memory system 202. For example, client 220 may dispatch a first request for data to cache memory bank 204A, and may subsequently dispatch a second request for data to cache memory bank 204B. Tag check unit 208A may indicate that the first request for data cannot be currently fulfilled by cache memory 210A, while tag check unit 208B may indicate that the first request for data is able to be fulfilled by cache memory 210B. In this example, cache memory bank 204B may be able to service the second request before cache memory bank 204A is able to service the first request, because it may be necessary for cache memory bank 204A to wait several cycles for the data requested by the first request for data to be retrieved from main memory and stored in cache memory 210A. Thus, cache memory banks 204A and 204B may service requests dispatched from client 200 in order of receipt by within a single cache memory bank, but may service requests out of order as compared with other cache memory banks in cache memory system 202 regardless of the status of requests from client 200 at other cache memory banks.

Clients accessing cache memory system 202 may each be associated with a read data buffer for each cache memory bank in cache memory system 202. Although the example illustrated by FIG. 2 includes a single read data buffer 218A for cache memory bank 204A and a single read data buffer 218B for cache memory bank 204B, the respective cache memory banks 204A and 204B may each contain or otherwise be associated with a read data buffer for each client that accesses cache memory system 202.

In the illustrated example, client 220 may be associated with read data buffers 218A and 218B, which may be included in respective cache memory banks 204A and 204B. In some examples, read data buffers 218A and 218B may not be included in respective cache memory banks 204A and 204B, but may instead be included in client 220 or elsewhere in computer system 200. Read data buffers 218A and 218B may each be configured to store and queue data requested by the requests for data from respective cache memories 210A and 210B, according to the order of receipt of the requests for data by respective pending buffers 206A and 206B. The data stored in read data buffers 218A and 218B may be returned to client 220 in the same order that the requests for data were dispatched by client 220 to cache memory system 202.

Read data buffers 218A and 218B may also provide deadlock protection in conjunction with deadlock protection unit 242 by buffering data requested by the requests for data sent by client 200. Details of deadlock protection by read data buffers, such as read data buffers 218A and 218B, will be discussed in greater detail below with respect to FIG. 3.

Client 220 may be one of the clients 106 shown in FIG. 1. Client 220 may include write control unit 222, request control unit 224, and read control unit 226. Components of write control unit 222, request control unit 224, and read control unit 226 may be implemented using hardware, software, or a combination of hardware and software. Although the example illustrated by FIG. 2 includes only a single client 220, computer system 200 may include one or more clients, and cache memory system 202 may be accessible by one or more clients.

Request control unit 224 may include a request buffer 232 and a demultiplexer 234 and may be configured to send requests for data to the cache memory system 202. Request buffer 232 may store and queue requests for data, and request buffer 232 may send the requests for data as well as an indication of a cache memory bank, such as a memory address or a bank ID, to demultiplexer 234. Based on the indication of the cache memory bank, demultiplexer 234 may send the requests for data to the appropriate cache memory bank. Request buffer 232 may also send an indication of the cache memory bank for every request sent to read control unit 226.

Write control unit 222 may be configured to send write requests to cache memory system 202. Write control unit 222 may include write order buffer 228 and demultiplexer 230. Write order buffer 228 may store and queue write requests in order of receipt, and may send write requests as well as an indication of a cache memory bank, such as a memory address or bank ID, to demultiplexer 230. Based on the indication of the cache memory bank, demultiplexer 230 may send the write requests to the appropriate cache memory bank.

Read control unit 226 may be configured to read the data requested by client 220 from cache system 202. Read control unit 226 may include read order buffer 236, alignment unit 238, and multiplexer 240. Read order buffer 236 may, for each request for data issued by request control unit 224 in client 220, receive and queue an indication, such as a memory address or a bank ID, of the cache memory bank to which the request for data was sent. Based on the indication, multiplexer 240 may read from the appropriate cache memory bank so that the data requested are received by client 220 in the same order as the requests for data were dispatched by client 220.

Computer system 200, in some examples, may comprise one or more processors such as processor 116 of FIG. 1. The one or more processors in computer system 200 may be configured to direct and control the operations of client 220 and cache memory system 202. Thus, the one or more processors in computer system 220 may be configured to direct and control the operations of write control unit 222, request control unit 224, read control unit 226, memory banks 204A and 204B, pending buffers 206A and 206B, tag check units 208A and 208B, cache memories 210A and 210B, write data buffers 212A and 212B, return buffers 214A and 214B, and read data buffers 218A and 218B.

Figure 3:
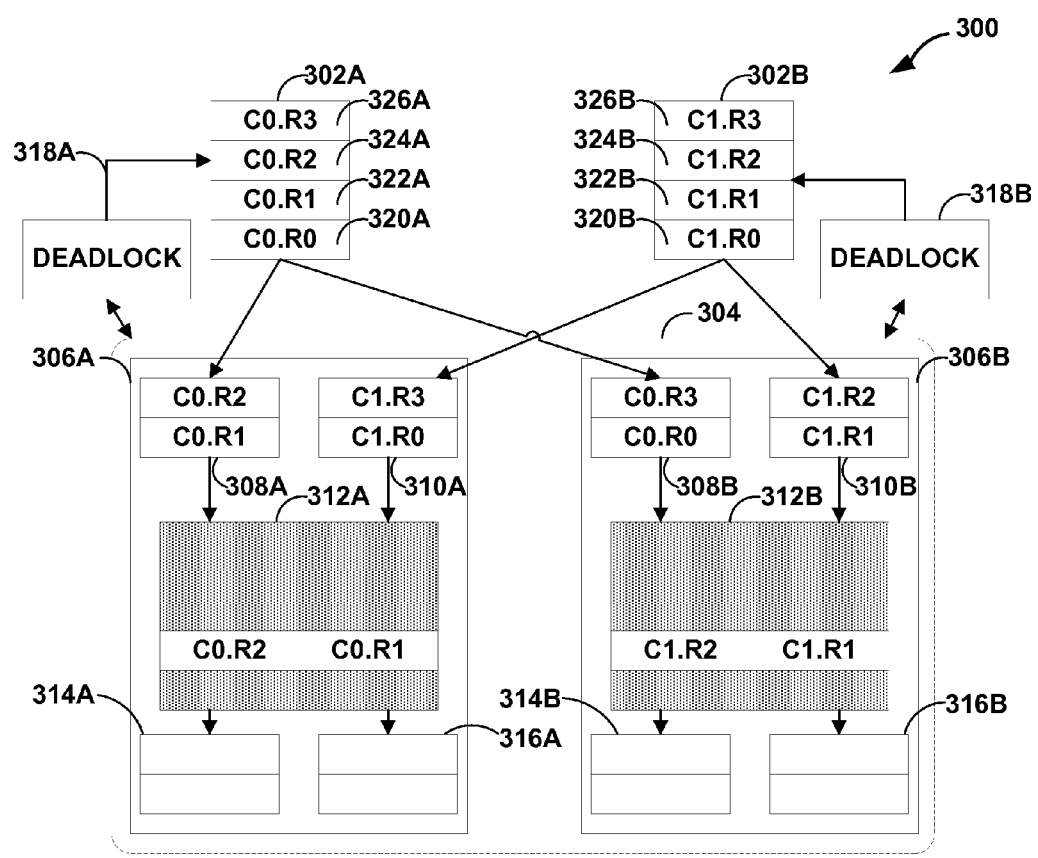
FIG. 3 is a block diagram illustrating an example technique for resolving deadlocks in an example cache memory system according to some aspects of the present disclosure.

FIG. 3 is a block diagram illustrating an example technique for resolving deadlocks in an example cache memory system. The example technique for resolving deadlocks as illustrated in FIG. 3 may be applicable for use with computer system 100 shown in FIG. 1 and with computer system 200 shown in FIG. 2. As shown in FIG. 3, computer system 300 may include clients 302A and 302B, and cache memory system 304. Computer system 300 may include a graphics processing system, and clients 302A and 304B may be rendering pipelines for the graphics processing system. In some examples, computer system 300 may include one or more processors that are configured to direct and control the example technique described below for resolving deadlocks.

Client 302A may sequentially dispatch requests 320A, 322A, 324A, and 326A in order to cache memory system 304, and client 304B may sequentially dispatch requests 320B, 322B, 324B, and 326B in order to cache memory 304. Requests 322A and 324A may be dispatched by client 302A to cache memory bank 306A and may be stored in pending buffer 308A. Requests 320A and 326A may be dispatched by client 302A to cache memory bank 306B and may be stored in pending buffer 308B. Requests 320B and 326B may be dispatched by client 302B to cache memory bank 306A and may be stored in pending buffer 310A. Requests 322B and 324B may be dispatched by client 302B to cache memory bank 306B and may be stored in pending buffer 310B.

In the example illustrated in FIG. 3, each of the requests 320A, 320B, 322A, 322B, 324A, 324B, 326A, and 326B sent by clients 302A and 302B may be read requests, and may target the same set index of cache memories 312A and 312B. Cache memories 312A and 312B may each be a two-way associative cache including two cache line slots. As shown in FIG. 3, cache memory 312A in cache memory bank 306A may be servicing requests 324A and 322A dispatched by client 302A, and cache memory 312B in cache memory 306B may be servicing requests 322B and 324B dispatched by client 304B. The requests stored in pending buffers 308A, 310A may not be serviced by cache memory 312A until requests 324A and 322A no longer occupy the cache line slots of cache memory 312A. Similarly, the requests stored in pending buffers 308B and 310B also may not be serviced by cache memory 312B until requests 322B and 324B no longer occupy the cache line slots of cache memory 312B.

The data requested by requests 324A and 322A occupying the cache line slots of cache memory 312A may not be returned to client 302A because requests 322A and 324A were dispatched by client 302A after request 320A, and the data requested by request 320A has yet to be returned to client 302A. Furthermore, the data requested by requests 324B and 322B occupying the cache line slots of cache memory 312B may not be returned to client 302B because requests 322B and 324B were dispatched by client 302B after request 320B, and the data requested by request 320B has yet to be returned to client 302A. However, request 320A may still in pending buffer 308B waiting to be serviced by cache memory 312B because requests 322B and 324B are occupying the cache line slots of cache memory 312B, and request 320B may still pending in pending buffer 310A because requests 322A and 324A are occupying the cache line slots of cache memory 312A. Therefore cache memory banks 306A and 306B may become deadlocked.

Read data buffers 314A, 316A, 314B, and 316B, similar to read data buffers 218A and 218B shown in FIG. 2, may be implemented to protect against the deadlock situation described above by acting as data buffers to free up the cache line slots of cache memories 312A and 312B. As shown in FIG. 3, read data buffers 314A and 314B may be associated with client 302A, and read data buffers 316A and 316B may be associated with client 302B. Data requested by requests 322A and 324A may be read out of cache memory 312A and stored in read data buffer 314A until the data requested by request 320A is returned to client 302A, and data requested by requests 322B and 324B may be read out of cache memory 312B and stored in read data buffer 316B until the data requested by request 320B is returned to client 302B. In this way, cache memories 312A and 312B may continue with servicing requests 320A, 320B, 326A, and 326B and requests may be returned back to respective clients 302A and 302B in the order they were dispatched by respective clients 302A and 302B.

Deadlock protection units 318A and 318B, operating the same as deadlock protection unit 242 of FIG. 2, may be associated with respective clients 302A and 302B. Deadlock protection unit 318A associated with client 302A may determine if pending buffers 308A and 308B associated with client 302A are able to accept additional requests for data from client 302A. Deadlock protection unit 318B associated with client 302B may determine if pending buffers 310A and 310B are able to accept additional requests for data from client 302B.

In some examples, deadlock protection unit 318A may determine if pending buffer 308A is able to accept additional requests for data from client 302 based on comparing the sum of the data sizes of out of order requests dispatched by client 302 to cache memory bank 306A with the size of read data buffer 314A. Out of order requests dispatched by client 302 to cache memory bank 306A may be requests dispatched by client 302 to cache memory bank 306A that are processed out of order compared to requests that were previously dispatched by client 302 to other cache memory banks, such as cache memory bank 306B.

A request made by client 302 to cache memory bank 306A may be an out of order request if any previous request sent by 302 to cache memory system 304 has not passed tag checking in any memory bank. The out of order request may or may not have passed tag checking itself. If the sum of the data sizes of all out of order requests made by client 302 to cache memory bank 306A is equal to or larger than the size of read data buffer 314A, then deadlock protection unit 318A may prevent cache memory bank 306A from accepting any additional requests for data from client 302 until the sum of the data sizes of all out of order requests made by client 302 to cache memory bank 306A is less than the size of read data buffer 314A.

Figure 4:
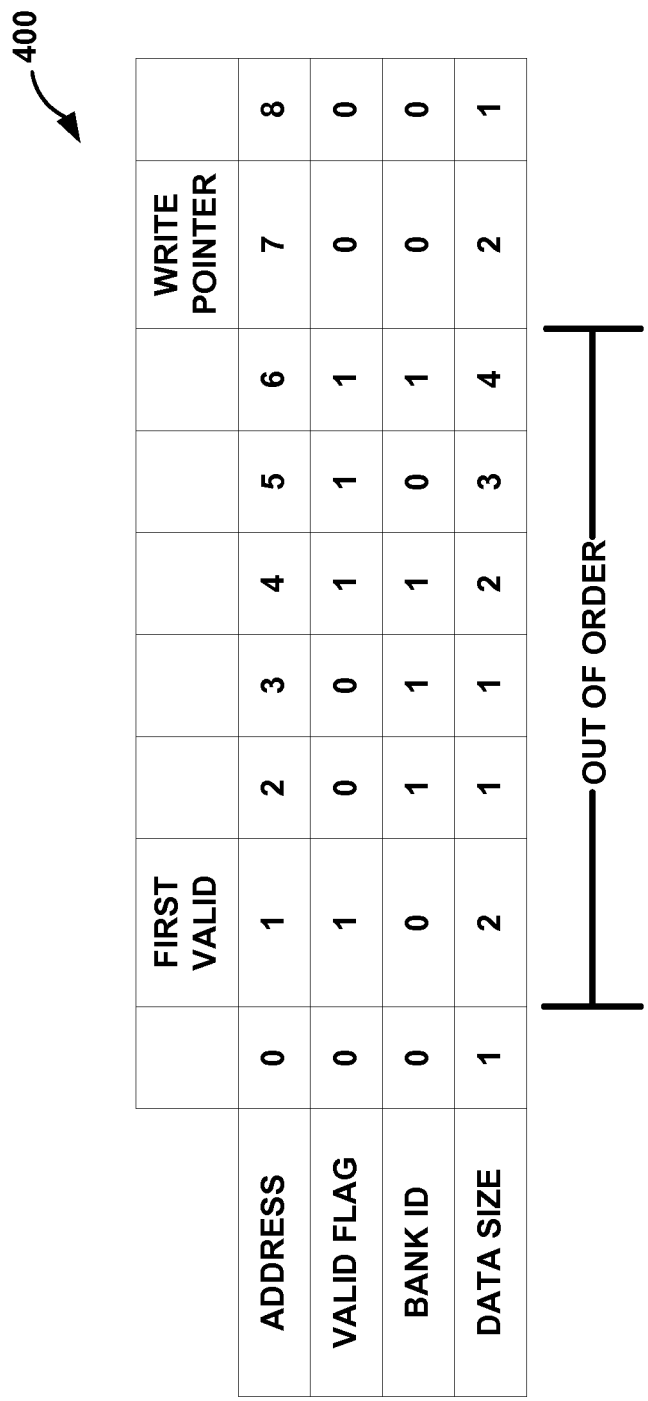
FIG. 4 is conceptual diagram illustrating an example data structure used to resolve deadlocks in an example cache memory system according to some aspects of the present disclosure.

FIG. 4 is block diagram illustrating an example data structure used to resolve deadlocks in an example cache memory system according to some aspects of the present disclosure. As shown in FIG. 4, data structure 400 may be used by a deadlock protection unit, such as the deadlock protection units 318A and 318B shown in FIG. 3, to determine if cache memory banks are able to accept additional requests for data from an associated client. Data structure 400 may be a ring buffer, and may store a valid flag, a cache memory bank ID, and a data size of requests from a client in order. The valid flag of a request may be initially set to 1 when the request is dispatched to cache memory, and may be set to 0 once the request has passed tag checking. The cache memory bank ID may indicate which cache memory bank the request is directed towards. The data size may indicate the size of the data requested by the request.

A write pointer and a first valid pointer may each point to a request in data structure 400. The write pointer may point to a request that will be overwritten when a new request is dispatched by the client. Typically, the write pointer may point to the oldest item in ring buffer 400. The first valid pointer may point to the oldest request in ring buffer 400 that still has a valid flag set to 1, meaning that it is still waiting to be tag checked. The first valid pointer can be found by traversing ring buffer 400 from the write pointer rightwards, including circling from the last item in ring buffer 400 to the first item in ring buffer 400, until a request that has the valid flag set to 1 is encountered.

The requests between the request pointed to by first valid pointer and the request pointed to by the write pointer, including the request pointed to by the first valid pointer, may be considered to be out-of-order requests. In this example, requests contained in address 1 to 6 of ring buffer 400 may be considered to be out-of-order requests.

The data sizes of all out-order-requests dispatched by a client to a cache memory bank may be summed up to determine if the cache memory bank is able to accept additional requests from the client. In the example illustrated in FIG. 4, the data sizes of all out of order requests in cache memory bank 0 may be calculated by summing the data size of the request at address 1 and the data size of the request at address 5 to produce a total data size of two. Therefore, if the data size of a read data buffer associated with the client in cache memory bank 0 is larger than five, then cache memory bank 0 may be able to accept additional requests from the client.

The data sizes of all out of order requests in cache memory bank 1 may similarly be calculated by summing the data size of the request at addresses 2, 3, 4, and 6 to produce a total data size of eight. Therefore, if the data size of a read data buffer associated with the client in cache memory bank 1 is larger than eight, then cache memory bank 1 may be able to accept additional requests from the client.

Figure 5:
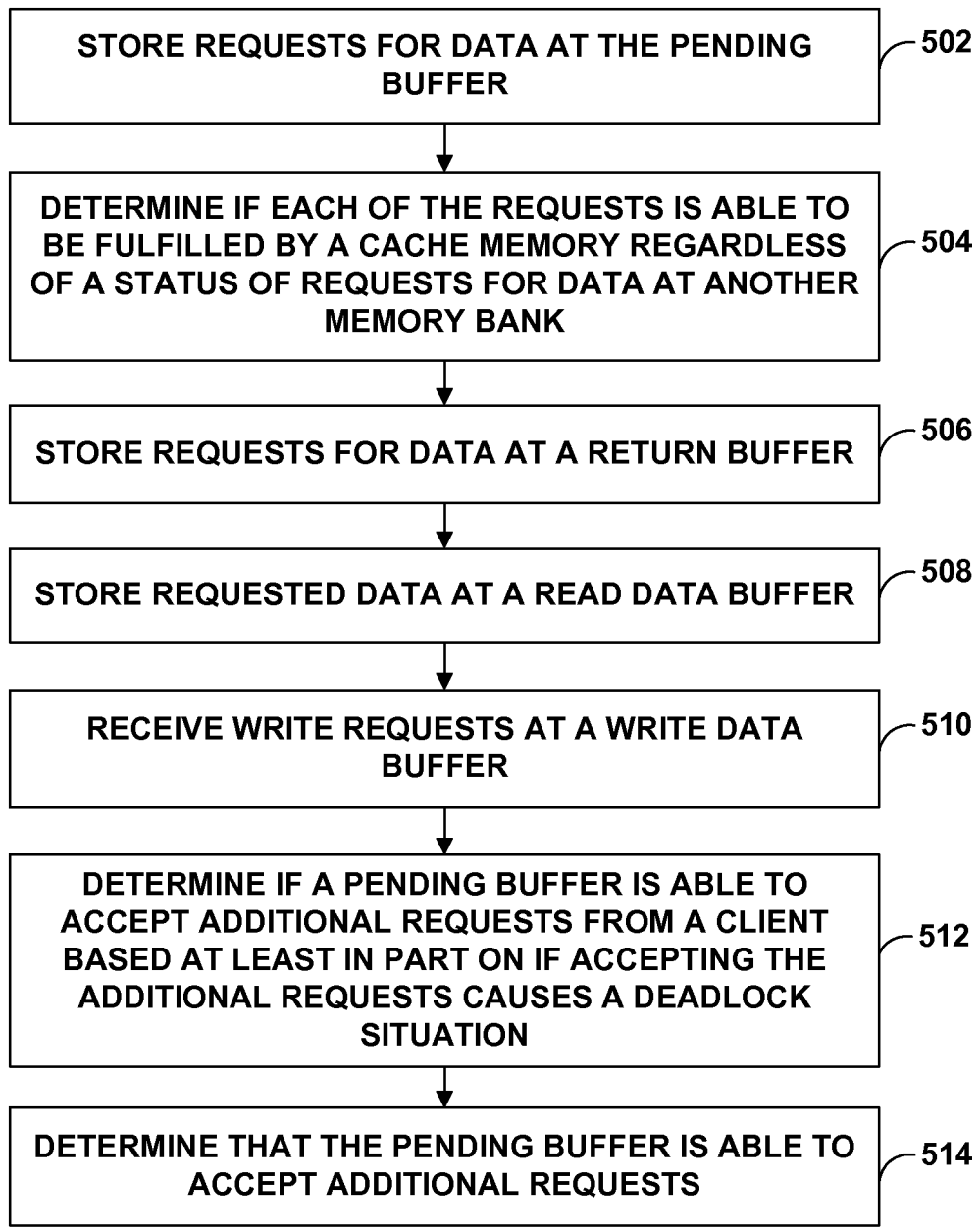
FIG. 5 is a flowchart illustrating an example method for increasing the throughput of multi-bank cache memory systems accessible by multiple clients according to some aspects of the present disclosure.

FIG. 5 is a flowchart illustrating an example method for increasing the throughput of multi-bank cache memory systems accessible by multiple clients according to some aspects of the present disclosure. In some examples, the multi-bank cache memory system may include one or more processors configured to direct and control the operation of the method shown in FIG. 5. In some examples, the method may be performed in a graphics processing system. As shown in FIG. 5, the method may include storing requests for data from a client in a pending buffer associated with the client for a first cache memory bank (502).

The method may further include determining if each of the requests for data is able to be fulfilled by a cache memory within the first cache memory bank regardless of a status of requests by the client for data at a second cache memory bank (504).

The method may further include, after the determining, storing, by a return buffer associated with the client for the first cache memory bank, the requests for data from the client (506).

The method may further include storing, by a read data buffer associated with the client for the first cache memory bank, data requested from the cache memory by the client according to an order of receipt of the requests for data in the pending buffer (508).

The method may further include receiving, by a write data buffer associated with the client for the first cache memory bank, write requests from the client to write data to the cache memory (510).

The method may further include determining if the pending buffer is able to accept additional requests for data from the client based at least in part on if accepting the additional requests causes a deadlock situation between the first cache memory bank and the second memory bank (512).

The method may further include determining that the pending buffer is able to accept additional requests for data from the client if a sum of data sizes of all out-of-order requests received from the associated client by the first cache memory bank for data is less than a size of the read data buffer (514).

Determining that the pending buffer is able to accept additional requests is based at least in part on a buffer that stores, for requests of the associated client, one or more of: a valid flag, a bank ID, and a data size.

In one or more examples, functions described may be implemented in a graphics processing system. In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A system comprising:
a cache memory system accessible by a plurality of clients, the cache memory system including a plurality of cache memory banks, wherein each cache memory bank of the plurality of cache memory banks includes:
cache memory, and
a tag checking unit configured to determine if a request for data from a client in the plurality of clients is able to be fulfilled by the cache memory regardless of a status of requests by the client at another cache memory bank within the plurality of cache memory banks;
a plurality of pending buffers associated with the plurality of clients for the plurality of cache memory banks, wherein the pending buffers are configured to store requests for data in order of receipt from an associated client in the plurality of clients pending a determination if the requests for data are able to be fulfilled by the cache memory;
a plurality of deadlock protection units associated with the plurality of clients, wherein the deadlock protection units are configured to determine whether a pending buffer for the cache memory bank within the pending buffers for the associated client is able to accept additional requests for data from the associated client based at least in part on comparing a sum of data sizes of all out-of-order requests by the associated client for data with a size of a read data buffer within the same cache memory bank and wherein the deadlock protection units are further configured to prevent the pending buffer from accepting the additional requests if accepting the additional requests causes a deadlock situation between the plurality of cache memory banks based at least in part on the determination of whether the pending buffer is able to accept the additional requests for data; and
a plurality of read data buffers associated with the plurality of clients for the plurality of cache memory banks, wherein the read data buffers are configured to store data requested from the cache memory by the associated client according to the order of receipt by a pending buffer associated with the associated client within the pending buffers.

2. The system of claim 1, wherein each of the plurality of cache memory banks further includes:
a plurality of return buffers associated with the plurality of clients for the plurality of cache memory banks, wherein the return buffers are configured to store the requests for data from the associated client in the plurality of clients after the tag checking unit has determined if the requests for data are able to be fulfilled by the cache memory.

3. The system of claim 1, wherein the pending buffer for the associated client is able to accept the additional requests for data from the associated client if the sum of data sizes of all out-of-order requests by the associated client for data is less than the size of the read data buffer within the same cache memory bank.

4. The system of claim 3, wherein each of the plurality of deadlock protection units includes a buffer that stores, for request of the associated client, one or more of:
a valid flag, a bank ID, and a data size.

5. The system of claim 1, further comprising:
a plurality of write data buffers associated with the plurality of clients for the plurality of cache memory banks, wherein the write data buffers are configured to receive write requests from the associated client to write data to the cache memory.

6. The system of claim 2, wherein the cache memory is configured to service the requests for data stored in the plurality of buffers regardless of a status of requests for data by the client at another cache memory bank within the plurality of cache memory banks.

7. A method comprising:
storing requests for data from a client in a pending buffer associated with the client for a first cache memory bank;
determining if each of the requests for data is able to be fulfilled by a cache memory within the first cache memory bank regardless of a status of requests by the client for data at a second cache memory bank;
determining if the pending buffer is able to accept additional requests for data from the client based at least in part on comparing a sum of data sizes of all out-of-order requests by the client for data with a size of a read data buffer within the first cache memory bank;
preventing the pending buffer from accepting the additional requests if accepting the additional requests causes a deadlock situation between the first cache memory bank and the second memory bank based at least in part on the determination of whether the pending buffer is able to accept the additional requests for data; and
storing, by the read data buffer associated with the client for the first cache memory bank, data requested from the cache memory by the client according to an order of receipt of the requests for data in the pending buffer.

8. The method of claim 7, further comprising:
after determining if each of the requests for data is able to be fulfilled by the cache memory, storing, by a return buffer associated with the client for the first cache memory bank, the requests for data from the client.

9. The method of claim 7, further comprising:
determining that the pending buffer is able to accept additional requests for data from the client if the sum of data sizes of all out-of-order requests received from the client by the first cache memory bank for data is less than the size of the read data buffer.

10. The method of claim 9, wherein determining that the pending buffer is able to accept additional requests is based at least in part on a buffer that stores, for requests of the client, one or more of: a valid flag, a bank ID, and a data size.

11. The method of claim 7 further comprising:
receiving, by a write data buffer associated with the client for the first cache memory bank, write requests from the client to write data to the cache memory.

12. The method of claim 8, further comprising:
servicing, by the cache memory, the requests for data stored in the return buffer regardless of a status of requests for data by the client at another cache memory bank within the plurality of cache memory banks.

13. An apparatus comprising:
means for storing requests for data from a client for a first cache memory bank;
means for determining if each of the requests for data is able to be fulfilled by a cache memory regardless of a status of requests by the client for data at a second cache memory bank;
means for determining if the means for storing requests for data is able to accept additional requests for data from the client based at least in part on comparing a sum of data sizes of all out-of-order requests by the client for data with a size of a read data buffer within the first cache memory bank;
means for preventing the means for storing requests for data from accepting the additional requests if accepting the additional requests causes a deadlock situation between the first cache memory bank and the second cache memory bank based at least in part on the determination of whether the pending buffer is able to accept the additional requests for data; and means for storing data requested from the cache memory by the client for the first cache memory bank.

14. The apparatus of claim 13, further comprising:
means for storing outstanding requests for data from the client.

15. The apparatus of claim 13, wherein the means for determining if the means for storing requests for data is able to accept additional requests for data from the client comprises:
means for determining that the means for storing requests for data is able to accept additional requests for data from the client if the sum of data sizes of all out-of-order requests by the client for data is less than the size of the means for storing data requested from the cache memory.

16. The apparatus of claim 15, wherein the means for determining if the means for receiving requests for data is able to accept additional requests for data from the client includes a buffer that stores, for requests of the client, one or more of: a valid flag, a bank ID, and a data size.

17. The apparatus of claim 13, further comprising:
means for receiving write requests from the client to write data to the cache memory.

18. The apparatus of claim 14, further comprising:
means for servicing, by the cache memory, the requests for data stored in the means for storing outstanding requests regardless of a status of requests for data by the client at another cache memory bank within the plurality of cache memory banks.

19. An apparatus comprising:
a memory; and
one or more processors configured to:
store requests for data from a client for a first cache memory bank;
determine if each of the requests for data is able to be fulfilled by a cache memory regardless of a status of requests by the client for data at a second cache memory bank;
determine if the pending buffer is able to accept additional requests for data from the client based at least in part on comparing a sum of data sizes of all out-of-order requests by the client for data with a size of a read data buffer within the first cache memory bank;
prevent the pending buffer from accepting the additional requests if accepting the additional requests causes a deadlock situation between the first cache memory bank and the second memory bank based at least in part on the determination of whether the pending buffer is able to accept the additional requests for data; and
store data requested from the cache memory by the client for the first cache memory bank.

20. The apparatus of claim 19, wherein the one or more processors is further configured to:
after determining if each of the requests for data is able to be fulfilled by the a cache memory, store, in a return buffer associated with the client for the first cache memory bank, the requests for data from the client.

21. The apparatus of claim 19, wherein the one or more processors is further configured to:
determine that the pending buffer is able to accept additional requests for data from the client if the sum of data sizes of all out-of-order requests received from the client by the first cache memory bank for data is less than the size of the read data buffer.

22. The apparatus of claim 21, wherein determining that the pending buffer is able to accept additional requests is based at least in part on a buffer that stores, for requests of the client, one or more of: a valid flag, a bank ID, and a data size.

23. The method of claim 19, wherein the one or more processors is further configured to:
receive, by a write data buffer associated with the client for the first cache memory bank, write requests from the client to write data to the cache memory.

24. The apparatus of claim 20, wherein the one or more processors is further configured to:
service, by the cache memory, the requests for data stored in the return buffer regardless of a status of requests for data by the client at another cache memory bank within the plurality of cache memory banks.

* * * * *